United States Patent [19]

Antognini et al.

[11] Patent Number: 4,468,602

[45] Date of Patent: Aug. 28, 1984

[54] METHOD FOR REDUCING THE CONSUMPTION OF A STEPPING MOTOR AND DEVICE FOR PERFORMING THE METHOD

[75] Inventors: Luciano Antognini, Champaign, Ill.; Hans-Jürgen Rémus, Neuchâtel, Switzerland

[73] Assignee: Asulab S.A., Bienne, Switzerland

[21] Appl. No.: 426,361

[22] Filed: Sep. 29, 1982

[30] Foreign Application Priority Data

Oct. 2, 1981 [CH] Switzerland ........................ 6340/81

[51] Int. Cl.$^3$ ............................................ H02K 29/02

[52] U.S. Cl. .................................. 318/696; 318/685; 368/157

[58] Field of Search ............... 368/157, 188; 318/696, 318/685, 341

[56] References Cited

U.S. PATENT DOCUMENTS

| | | | |
|---|---|---|---|
| 4,192,131 | 3/1980 | Hojokawa et al. | 368/157 |
| 4,216,648 | 8/1980 | Maire | 368/66 |

FOREIGN PATENT DOCUMENTS

| | | |
|---|---|---|
| 2944872 | 3/1981 | Fed. Rep. of Germany . |
| 2413633 | 7/1979 | France . |
| 2458939 | 1/1981 | France . |
| 2006995 | 5/1979 | United Kingdom . |
| 2059649 | 4/1981 | United Kingdom . |
| 2061570 | 5/1981 | United Kingdom . |
| 2063529 | 6/1981 | United Kingdom . |
| 2064898 | 6/1981 | United Kingdom . |

OTHER PUBLICATIONS

Crider, C. H. & Frankeny, R. F., "Current Tracking Chopper Motor Driver", IBM Technical Disclosure Bulletin, vol. 23, No. 4, Sept. 1980, pp. 1303–1304.

*Primary Examiner*—J. V. Truhe
*Assistant Examiner*—Saul M. Bergmann
*Attorney, Agent, or Firm*—Pollock, Vande Sande & Priddy

[57] ABSTRACT

The present invention concerns a method and a device for reducing the consumption of a stepping motor by automatically adapting the duration of each drive pulse supplied to said motor to the mechanical load that its rotor is to drive.

The method comprises forming each drive pulse by a series of elementary pulses separated by interruption periods, and determining the mechanical load by measuring, during said interruption periods, a parameter which is representative of the variation in the voltage induced in the winding (11*a*) of the motor by the rotary movement of the rotor.

14 Claims, 11 Drawing Figures

METHOD FOR REDUCING THE CONSUMPTION OF A STEPPING MOTOR AND DEVICE FOR PERFORMING THE METHOD

CROSS REFERENCE TO RELATED APPLICATION

This application is related to Ser. No. 426,316 filed Sept. 29, 1982, by the same applicants for Method and Device for Controlling a Stepping Motor of a Timepiece.

BACKGROUND OF THE INVENTION

The present invention concerns a method for reducing the consumption of a stepping motor by automatically adapting the duration of each drive pulse supplied to the motor to the load that the motor is to drive.

The invention also concerns a device for controlling a stepping motor of a timepiece, for performing the abovementioned method.

A number of methods for reducing the consumption of a stepping motor have already been proposed.

French Pat. No. 2 200 675 for example proposes measuring the load which the motor is required to drive, by permanently measuring the current flowing in the winding of the motor when a drive pulse is applied to the winding and interrupting the drive pulse when the current passes through a minimum.

Detecting the minimum current value is difficult because of the parasitic noise which may be superimposed on the current measuring signal. This means that the known method is generally unreliable. In addition, when employed with some motors, and when the load which is to be driven by the motor becomes substantial, the current minimum disappears so that the known method can no longer be used.

SUMMARY OF THE INVENTION

The present invention aims to propose a reliable and sure method which is suitable for all types of motor and which permits the length of the drive pulse to be adapted to the load which the motor is required to drive.

The method according to the invention comprises producing, in the course of each drive pulse, a plurality of elementary interruption periods during which the power supply source is disconnected from the winding, and determining the mechanical load driven by the motor by measuring, during the interruption periods, a parameter which is representative of the variation in the movement induced voltage, that is to say, the voltage induced in the winding of the motor by the movement of the rotor.

The voltage $U_i$ which is induced in the winding of the motor by virtue of the rotary movement of the rotor depends on the speed of the rotor, and the variation in respect of time thereof depends on the load which is to be driven by the motor. It is therefore possible to determine the load to be driven, by measuring the variation in the movement induced voltage from the beginning of the drive pulse.

During the rotary movement of the rotor, the induced voltage $U_i$ rises, reaches a maximum and then falls in a different manner, depending on whether the load on the motor is low or high. In the first situation, the induced voltage rises and falls at moments which are closer to the beginning of the drive pulse, than in the second situation.

By detecting the time $t_1$ at which the induced voltage reaches a suitably selected predetermined value $U_{is}$ and by measuring the period of time which elapses between the beginning of the drive pulse and the time $t_1$, the result obtained is a measure of the variation of the induced voltage and therefore of the instantaneous value of the load driven by the motor. As that measurement operation is performed at the very moment that the drive pulse is applied to the winding of the motor, it is hence possible to regulate the length of the same drive pulse in dependence on the instantaneous value of the load, thus providing direct control.

The applicants have found that an optimum duration of the drive pulses, providing minimum consumption of the motor while guaranteeing that the rotor correctly terminates all its stepping movements, can be determined by measuring the period of time $T_d$ which elapses between the beginning of the drive pulse and the time $t_1$, and by calculating for the total duration of the drive pulse, a value $T_{opt}=\lambda T_d+\Delta$ in which $\lambda$ and $\Delta$ are constants which are determined experimentally for each type of motor and which are valid for all motors having the same electrical and magnetic characteristics.

BRIEF DESCRIPTION OF THE DRAWINGS

The features and advantages of the invention will be better appreciated from the following description of a number of embodiments of the invention, with reference to the accompanying drawings in which.

DESCRIPTION OF THE PREFERRED EMBODIMENTS

Figure 1:
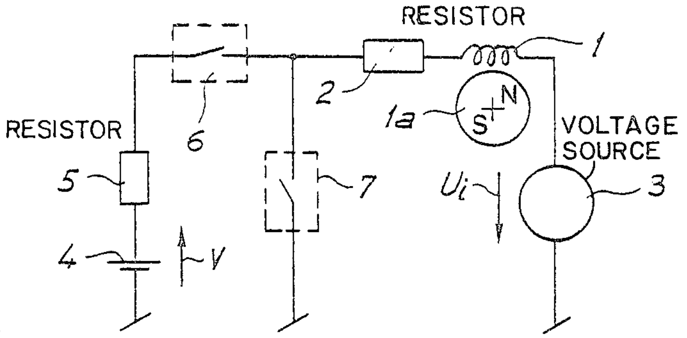
FIG. 1 is an equivalent circuit diagram of a stepping motor.

FIG. 1 shows the equivalent circuit diagram of a stepping motor. The winding of the motor is represented by a winding 1 of inductance L and with a resistance of zero, and a resistor 2 whose resistance R is equal to the resistance of the winding of the motor. A rotor 1*a* which is diagrammatically indicated by its bipolar permanent magnet is magnetically coupled to the winding 1, 2 by a stator (not shown). The movement induced voltage, that is to say, the voltage which is induced in the winding of the motor by the rotary movement of the rotor is diagrammatically indicated in FIG. 1 by the voltage source 3. The value of the induced voltage is indicated by $U_i$.

The power supply source for the motor is represented by a source 4 having zero internal resistance and producing an electromotive force V, and a resistor 5 of resistance R* equal to the internal resistance of the real source for supplying the motor.

Finally, in the circuit diagram shown in FIG. 1, the circuit for controlling the motor is diagrammatically indicated by a first switch 6 for connecting and disconnecting the source 4, 5 of the winding 1, 2 of the motor, and a second switch 7 for short-circuiting the winding or eliminating the short-circuited condition thereof.

Broadly, the currents and voltages involved in operation of the motor are given by the following relationship:

$$U_m = R \cdot i + L(di/dt) + U_i \quad (1)$$

in which $U_m$ is the voltage at the terminals of the motor and i is the current flowing in the motor winding. When the switch is closed and the switch 7 is open, the voltage $U_m$ is equal to $V - R^* \cdot i$. During the drive pulse interruption periods, the switch 6 is open and the switch 7 is closed. The voltage $U_m$ is therefore zero, provided that the internal resistance of the switch 7 is negligible, which is the case under practical circumstances. During the interuption periods, above-indicated equation (1) can therefore be written as follows:

$$-U_i = R \cdot i + L(di/dt) \quad (2)$$

If the interruption periods are of a duration T1 which is much shorter than the time constant $\tau = L/R$ of the winding, it may be assumed that $$i \simeq I_a \text{ and } \frac{di}{dt} \simeq \frac{I_b - I_a}{T1}$$

in which $I_a$ and $I_b$ are the values of the current i at the beginning and at the end of each interruption period.

Under these conditions, when L is replaced by $R \cdot \tau$, equation (2) can be written as follows:

$$-U_i = R \cdot I_a + R \cdot \tau \frac{I_b - I_a}{T1} \quad (3)$$

or:

$$U_i = R \cdot \frac{\tau}{T1} \left( I_a \frac{\tau - T1}{\tau} - I_b \right)$$

Equation (3) shows that the voltage $U_i$ induced in the motor winding by the rotary movement of the rotor may be determined in each interruption period, that is to say, in each period during which the power supply source is disconnected from the winding and the winding is in a short-circuited condition, by measuring the values $I_a$ and $I_b$ of the current at the beginning and at the end of each of the interruption periods, with the values R, T1 and $\tau$ being known.

In practice, there is no need to measure the voltage $U_i$ itself and compare it to a threshold voltage $U_{is}$ to determine the time $t_1$. It is only necessary for example to determine the value of the term $$\left( I_a \frac{\tau - T1}{\tau} - I_b \right)$$

in above-indicated equation (3), and to compare that value to a reference value $\beta = U_{is} \cdot 1/R \cdot T1/\tau$.

The value of the term $$\left( I_a \frac{\tau - T1}{\tau} - I_b \right)$$

may be determined by measuring and storing the value of the current $I_a$ at the beginning of the measuring period, multiplying the measured and stored value by a constant $\propto = \tau - T1/\tau$ which is known since $\tau$ and T1 are known, measuring the current $I_b$ at the end of the measuring period, and calculating the difference $(\propto \cdot I_a - I_b)$.

That difference is then compared to the value $\beta$, and a signal is produced when the comparison operation shows that $(\propto \cdot I_a - I_b) \geqq \beta$. That signal indicates that the voltage $U_i$ has become equal to or higher than the threshold voltage $U_{is}$ and that therefore the time $t_1$ has been reached or passed.

In order to determine the time $t_1$, it is also possible to measure the current $I_a$ and calculate the product $\propto \cdot I_a$ as above, calculate the difference $(\propto \cdot I_a - \beta)$, measure the current $I_b$, flowing in the winding at the end of the interruption period, and compare that current $I_b$ to the difference $(\propto \cdot I_a - \beta)$. When the current $I_b$ is equal to or higher than the difference $(\propto \cdot I_a - \beta)$, the voltage $U_i$ is equal to or higher than the reference voltage $U_{is}$.

It should be noted that the foregoing considerations remain valid if the calculation and comparison operations are performed by using, in place of the values of the currents $I_a$ and $I_b$, the values of two currents $I_a'$ and $I_b'$ which are measured at the beginning and at the end of a measuring period which is of a duration T1' that is less than T1 and if of course the value T1 is replaced by that value T1'.

There is no need to wait for the end of the interruption or measuring period to carry out the various calculation and comparison operations referred to above. It is possible continuously to measure the current i flowing in the winding after the beginning of the interruption or measuring period and to use the value of that current, in place of the current $I_b$, to perform the calculation and comparison operations, also on a continuous basis.

In the examples which will be described hereinafter, the various currents $I_a$, $I_b$ and i are measured by the values of the voltages $U_a$, $U_b$ and u which they respectively produce in passing through a measuring resistor connected in series with the winding of the motor during the drive pulse interruption periods. It will be appreciated that the various calculations referred to hereinbefore are then performed on the voltages which represent such currents, and which are proportional thereto. The factor $\beta$ is then replaced by a factor: $\beta = U_{is} \cdot R_m / R \cdot T1/\tau$ in which $R_m$ is the value of the measuring resistor.

Equation (3) above, under those conditions, then becomes:

$$U_i = \frac{R}{R_m} \cdot \frac{\tau}{T1} \left( U_a \cdot \frac{\tau - T1}{\tau} - U_b \right) \quad (4)$$

Figure 2:
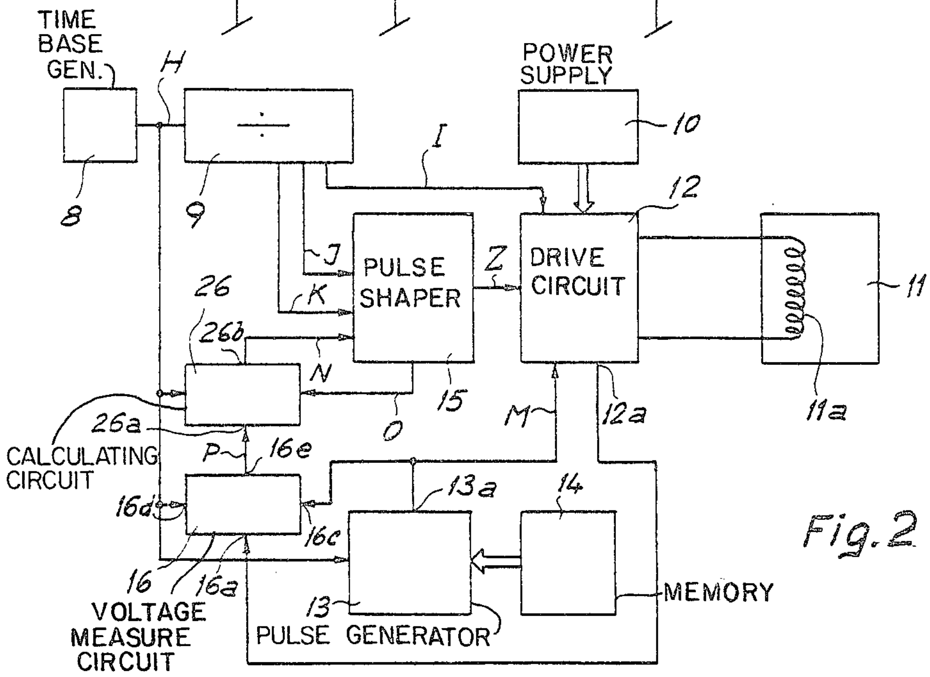
FIG. 2 is a synoptic diagram of a control device in accordance with one embodiment of the invention.

The timepiece shown by way of example in FIG. 2 comprises a circuit 8 for generating a time base signal H at a frequency for example of 16384 Hz. The circuit 8 is formed by a quartz oscillator and a first divider stage for dividing by two, its output being connected to the input of a divider circuit 9 which, on the basis of the time signal H, produces various periodic signals including more particularly a signal I at a frequency equal to ½ Hz, a signal J at a frequency of 1 Hz and a signal K at a frequency of 64 Hz.

Figure 2A:
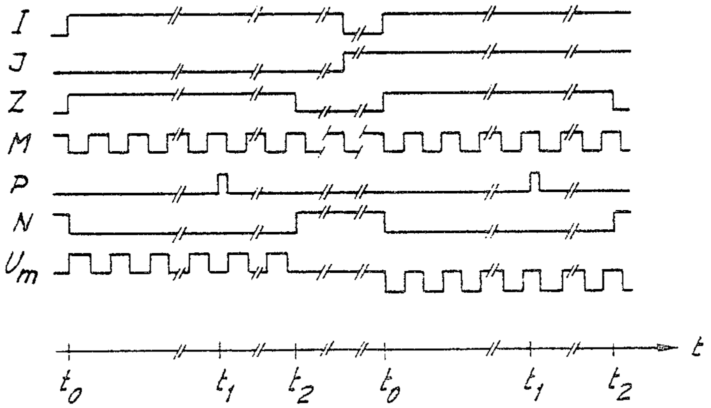
FIG. 2*a* is a diagram showing a number of signals as measured in the FIG. 2 circuit.

The timepiece shown in FIG. 2 further comprises a pulse shaper circuit 15 having an output which produces a signal, designated by means of Z, formed by a series of pulses which go to state "1" whenever the signal J itself goes to state "1", that is to say, every second (see FIG. 2*a*). The pulses of the signal Z go back to state "0" in response to a signal N supplied by a calculating circuit 26 which will be described hereinafter. The moment at which the signal N appears therefore determines the duration of the pulses of the signal Z.

The pulse shaper circuit 15 also supplies an auxiliary signal indicated at 0, which is formed by pulses which go to state "1" at the same time as the pulses Z but which are fixed in duration, being for example 7.8 milliseconds in duration.

Each time that the signal Z is at state "1", a drive circuit 12 supplies a drive pulse to the winding 11*a* of the motor 11. The voltage measured at the terminals of the winding 11*a* is indicated at $U_m$ in FIG. 2*a*. The energy applied to the winding 11*a* during each drive pulse is supplied by a power supply source 10.

The polarity of the drive pulses is determined by the logic state of the signal I which is alternately at state "0" and at state "1" for one second.

The drive circuit 12 is also so arranged that the drive pulses are chopped in response to a signal M formed by pulses at a high frequency. Each time that the signal M is at state "1", for example, the drive circuit 12 interrupts the connection between the power supply source 10 and the winding 11*a*, and short-circuits the winding. During those interruption periods, the circuit 12 supplies, at an output 12*a*, a voltage that is proportional to the current flowing in the winding 11*a*. That voltage is used by a measuring circuit 16, an example of which will be described hereinafter, to determine the time $t_1$ at which the voltage $U_i$ induced in the winding 11*a* by the rotary movement of the rotor attains the reference value $U_{is}$.

At time $t_1$, the measuring circuit 16 produces, at its output 16*e*, a signal P which in turn is used by the calculating circuit 26 to produce the signal N at a time $t_2$. The calculating circuit 26, an example of which will be described hereinafter, is so arranged that the time $t_2$ is separated from the beginning of the drive pulse by a time equal to $(\lambda \cdot T_d + \Delta)$ in which λ and Δ are the above-mentioned, experimentally determined constants. That period of time is therefore equal to the optimum duration of the drive pulse. As the signal N causes the signal Z to go back to state "0", the signal Z and therefore the drive pulse are equal in duration to the above-mentioned optimum duration.

The signal M is produced by a circuit 13, an example of which will be described hereinafter. The duration of each pulse of the signal M and the duration of the period of time which separates those pulses are determined by the content of a memory 14.

Figure 3:
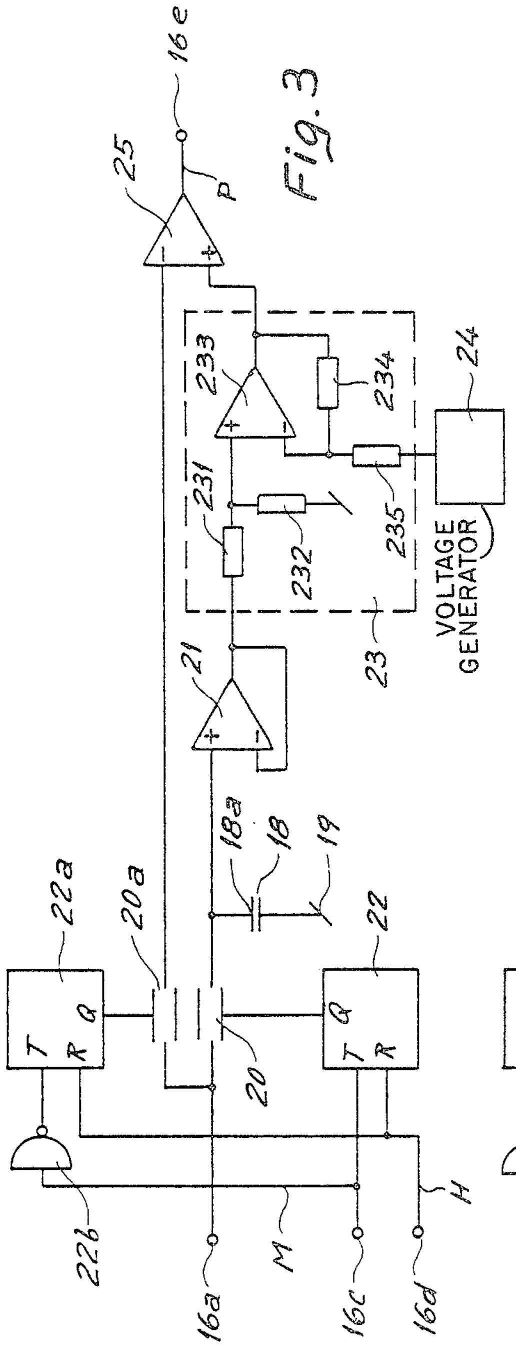
FIGS. 3 and 3*a* are detailed circuit diagrams of a part of the device shown in FIG. 2, in two embodiments of the invention.

FIG. 3 shows the circuit diagram of an example of a first embodiment of the circuit 16 for measuring the induced voltage $U_i$, in the device shown in FIG. 2. The circuit 16 comprises an input 16*a* which receives from the circuit 12 the voltage proportional to the current flowing in the winding 11*a*, a capacitor 18 having one plate connected to earth 19 and the other plate 18*a* connected to the input 16*a* by way of a transmission gate 20 and to the non-inverting input of an operational amplifier 21, the output of which is directly connected to its inverting input. The control electrode of the gate 20 is connected to the output Q of a T-type flip-flop 22 whose clock input T receives the signal M by way of the input 16*c* and whose zero resetting input R receives the signal H by way of the input 16*d*.

A calculating circuit 23 comprises a voltage divider formed by two resistors 231 and 232 which are connected in series between the output of the amplifier 21 and earth, and a differential amplifier 233 whose non-inverting input is connected to the junction between the resistors 231 and 232. The circuit 23 further comprises two resistors 234 and 235 which are connected in series between the output of the amplifier 233 and a voltage generator 24. The inverting input of the amplifier 233 is connected to the junction between the resistors 234 and 235.

The output of the amplifier 233 is connected to the noninverting input of another differential amplifier 25 whose inverting input is connected to the terminal 16*a* by way of a transmission gate 20*a*. The control electrode of the gate 20*a* is connected to the output Q of a T-type flip-flop 22*a* whose clock input T receives the signal M by way of an inverter 22*b* and whose input R receives the signal H.

The output of the amplifier 25 forms the output 16*e* of the measuring circuit.

The most of operation of the circuit shown in FIG. 3 is as follows: at the moment that the signal M goes to state 1, at the beginning of each interruption period, the output Q of the flip-flop 22 switches to state "1", which causes the gate 20 to be opened. When the signal H also goes to state "1", about 30 microseconds later, the output Q of the flip-flop 22 goes back to state "0" and the gate 20 is closed again. While the gate 20 is open, the capacitor 18 is charged up to a voltage $U_a$ that is proportional to the current $I_a$ flowing in the winding 11*a* at that time. By way of the amplifier 21, the voltage $U_a$ is applied to the voltage divider formed by the resistors 231 and 232. The values of those resistors are such that the voltage applied to the non-inverting input of the amplifier 233 is equal to $\propto \cdot U_a$ in which $\propto$ is equal to $\tau - T1/\tau$ as above, that is to say, it is proportional to $\propto \cdot I_a$.

The resistors 234 and 235 and the voltage supplied by the generator 24 are such that the output of the amplifier 233 produces a voltage equal to $(\propto \cdot U_a - \beta')$, in which $\beta' = U_{is} \cdot R_m / R \cdot T1/\tau$ as above.

At the end of the interruption period, the signal M goes to state "0" and the output Q of the flip-flop 22*a* goes to state "1" for a period of about 30 microseconds. The voltage $U_b$ that is proportional to the current $I_b$ flowing in the winding 11*a* at that time is therefore applied to the inverting input of the amplifier 25 which compares it to the voltage ($\propto \cdot U_a - \beta'$) at the output of the amplifier 233. As long as the voltage $U_b$ is higher than the voltage ($\propto \cdot U_a - \beta'$), the output of the amplifier 25 remains at state "0". If the voltage $U_b$ is lower than the voltage ($\propto \cdot U_a - \beta'$), the output of the amplifier 25 produces the signal P, going to state "1", which indicates that the voltage $U_i$ induced in the winding by the rotary movement of the rotor has exceeded the threshold voltage $U_{is}$. That going to state "1" of the output of the amplifier 25 marks the time $t_1$.

Figure 3A:
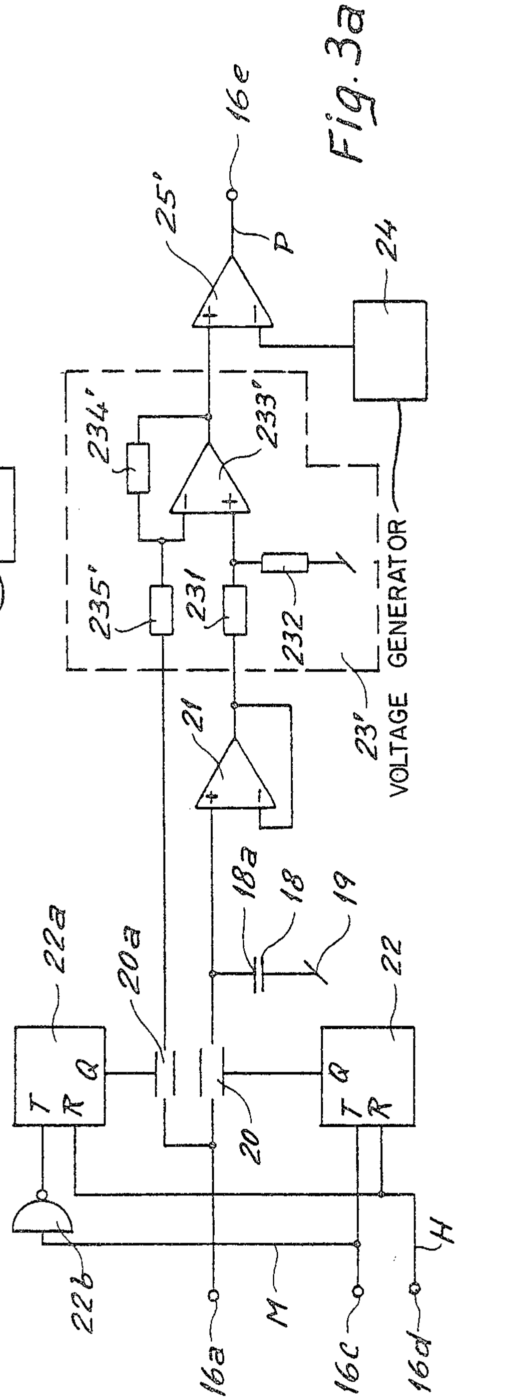

FIG. 3*a* shows the circuit diagram of a second embodiment of the circuit 16 for measuring the induced voltage $U_i$. The components 18, 20, 20*a*, 21, 22, 22*a*, 22*b*, 24, 231 and 232 of the illustrated circuit are identical to the components denoted by the same references in FIG. 3, and operate in the same way.

The signal $\propto \cdot U_a$ present at the junction between the resistors 231 and 232 is applied to the non-inverting input of an amplifier 233'. Two resistors 234' and 235' are connected in series between the gate 20*a* and the output of the amplifier 233'. The junction between those two resistors is connected to the inverting input of the amplifier 233'. The output of the amplifier 233' is connected to the non-inverting input of an amplifier 25' whose inverting input is connected to the output of the voltage generator 24. In this case, the output of the amplifier 25' forms the output 16*e* of the measuring circuit 16.

The resistors 234' and 235' are such that the output of the amplifier 233' produces a voltage equal to ($\propto \cdot U_a - U_b$). The amplifier 25' compares the voltage to the voltage $\beta'$ supplied by the generator 24. The output of the amplifier 25' produces the signal P, going to state "1": when the voltage ($\propto \cdot U_a - U_b$) becomes higher than the voltage $\beta'$, that is to say, again when the voltage $U_i$ induced in the winding by the rotary movement of the rotor becomes higher than the threshold voltage $U_{is}$.

As already pointed out above, there is no need to wait for the end of the interruption period in order to carry out the different calculation and comparison steps referred to above. The gate 20*a*, the flip-flop 22*a* and the inverter 22*b* may be omitted from the circuits shown in FIGS. 3 and 3*a*, in which case input 16*a* of the circuit 16 is directly connected to the inverting input of the amplifier 25 and the resistor 235' respectively. In that case, the calculation and comparison operations are therefore performed on a continuous basis on the voltage u produced in the measuring resistor by the current i flowing in the winding 11*a* after the beginning of the interruption period. The signal P is then produced as soon as the voltage u falls below the voltage ($\propto \cdot U_a - \beta'$) or as soon as the voltage ($\propto \cdot U_a - u$) is higher than the voltage $\beta'$.

Figure 4:
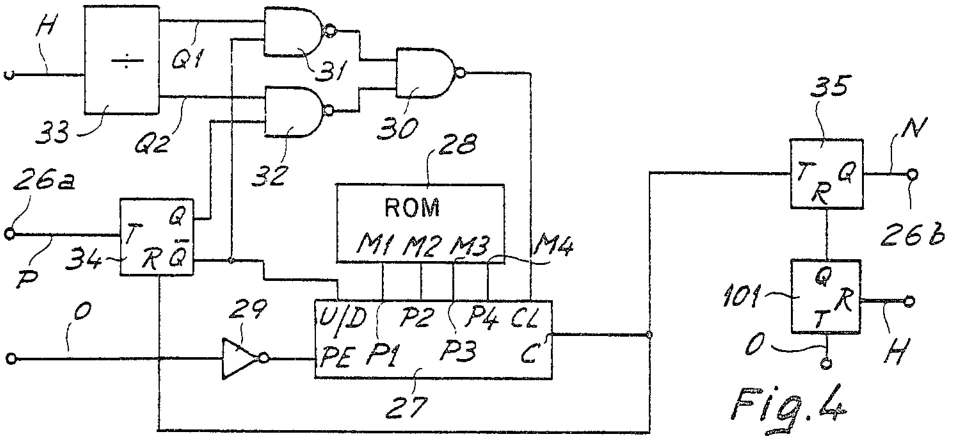
FIG. 4 is a detailed diagram of a second part of the device shown in FIG. 2, in one embodiment of the invention.

FIG. 4 shows an embodiment of the calculating circuit 26 shown in FIG. 2. In that embodiment, the circuit 26 comprises an up-down preselection counter 27 having preselection terminals P1, P2, P3 and P4 which are respectively connected to the output terminals M1, M2, M3 and M4 of a read only memory 28. The counter 27 comprises a preselection control input PE for receiving the signal 0 by way of an inverter 29. The clock input CL of the counter 27 is connected to the output of a NAND-gate 30 having two inputs, each connected to the output of a respective NAND-gate 31 and 32, respectively. The circuit 26 further comprises a divider circuit 33 for supplying two signals Q1 and Q2 at respective frequencies f1 and f2, in response to the signal H. The signal Q1 is applied to one of the inputs of the gate 31 while the signal Q2 is applied to one of the inputs of the gate 32. A second input of the gate 31 is connected to the output $\overline{Q}$ of a T-type flip-flop 34 having its clock input T connected to the input terminal 26*a* of the circuit 26. A second input of the gate 32 is connected to the output Q of the flip-flop 34. The input U/D for controlling the direction of counting of the counter 27 is connected to the output $\overline{Q}$ of the flip-flop 34.

The counter 27 also comprises a coincidence output C which goes to state "1" for a short time when the content of the counter reaches a value of zero. The output C is connected to the clock input T of a T-type flip-flop 35 whose output Q forms the output 26*b* of the circuit 26 and whose resetting input R is connected to the output Q of a T-type flip-flop 101. The latter flip-flop receives the signal 0 at its clock input T and the signal H at its resetting input R. The output C of the counter 27 is also connected to the resetting input R of the flip-flop 34.

Figure 4A:
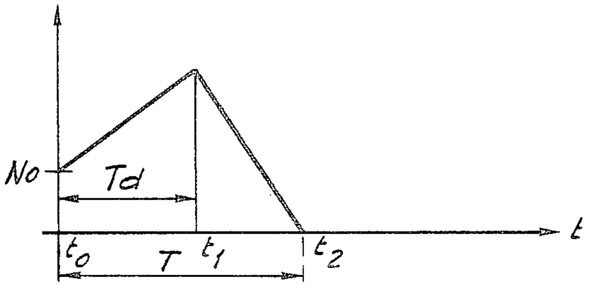
FIG. 4*a* is a diagram showing, in respect of time, the counting condition of the counter 27 shown in the circuit of FIG. 4.

FIG. 4*a* illustrates the mode of operation of the circuit 26 shown in FIG. 4.

Between the drive pulses, the signal 0 is at state "0" and the input PE of the counter 27 is at state "1". The counter 27 is therefore blocked in the condition in which its content corresponds to the content of the memory 28, which is indicated by No. At time $t_o$ which coincides with the beginning of a drive pulse, the signal 0 goes to state "1", setting the input PE of the counter 27 to state "0", whereby the counter 27 is freed and begins to count, in the normal direction, the pulses issuing from the gate 30, starting from that condition No. That counting operation is performed at a frequency f1. At time $t_1$ at which the voltage $U_i$ reaches the value $U_{is}$, the input 26*a* goes to state "1" and the outputs Q and $\overline{Q}$ of the flip-flop 34 respectively go to state "1" and to state "0". The up-down control input of the counter 27 goes to state "0". From that time, the counter 27 operates in a down-counting mode. The down-counting operation is performed at the frequency f2. At the time $t_2$ at which the content of the counter 27 becomes equal to zero, its output C goes to state 1 for a short time, setting the flip-flop 35 to state "1", the output Q of which, which was previously at state "0", going to state "1".

At the same time, the outputs Q and $\overline{Q}$ of the flip-flop 34 go back to state "0" and state "1" respectively. At the end of the pulse 0, the input PE of the counter 27 goes back to state "1". The content of the counter 27 therefore resumes the fixed value in the memory 28 and remains at that value until the signal 0 goes to state "1" again.

The output Q of the flip-flop 35 is reset to state "0" at the beginning of each drive pulse by the state "1" which appears at the output Q of the flip-flop 101 in response to the signal 0. That state "1" is suppressed after about 30 microseconds when the signal H goes to state "1".

FIG. 4*a* shows that the time T which elapses between the beginning $t_o$ of the drive pulse and the occurrence, at time $t_2$, of the signal N at the output 26*b* of the circuit 26, is linked to the time $T_d$ which elapses between times $t_o$ and $t_1$, by the following relationship:

$$T = T_d \frac{f1 + f2}{f2} + \frac{No}{f2}$$

in which f1 and f2 are the frequencies of the signals supplied by the outputs Q1 and Q2 of the divider 33 and No is the number contained in the memory 28 and therefore the number contained in the counter 27 at time $t_o$.

Comparison between that equation and above-mentioned equation $T_{opt}=\lambda T_d+\Delta$, in which λ and Δ are constants that are determined experimentally for each type of motor, makes it possible to choose values for f1, f2 and No such that the period of time T which elapses between the beginning of the drive pulse and the appearance of the signal N is always equal to the optimum duration $T_{opt}$ of the drive pulse.

Figure 5A:
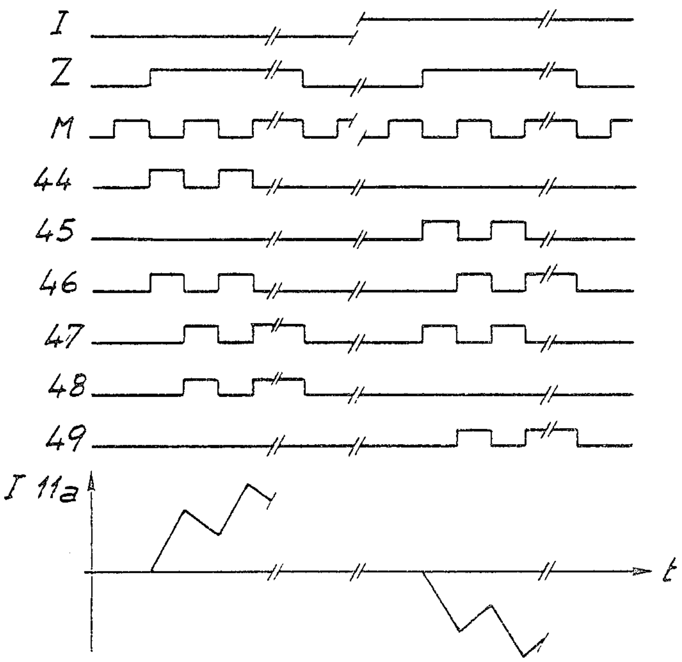
FIG. 5 is a detailed diagram showing a third part of the device of FIG. 2, in accordance with an embodiment of the invention, FIG. 5*a* partly shows the configurations of the current flowing in the winding of the motor and the signals measured at various points in the circuit shown in FIG. 5.
Figure 5:
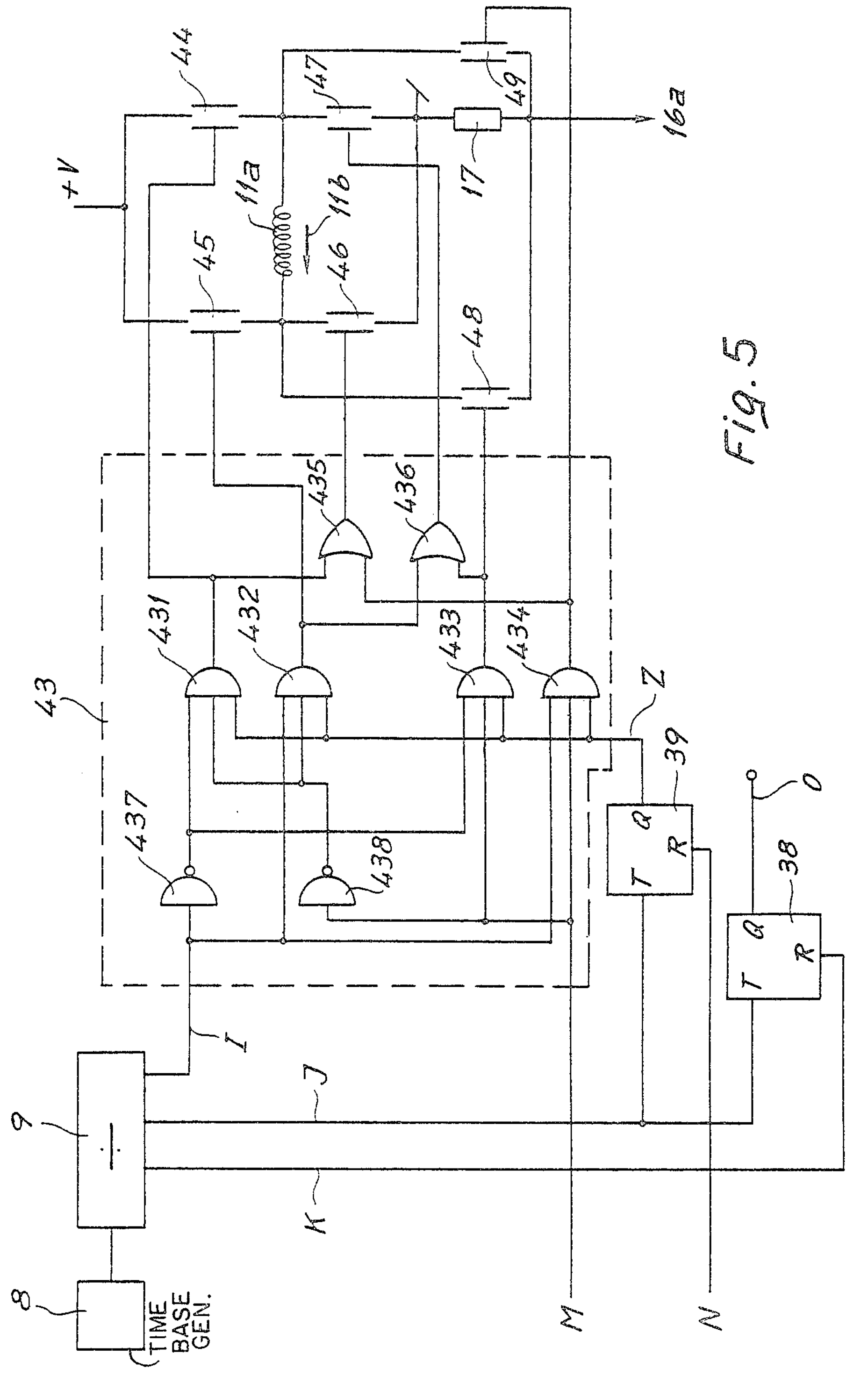

FIG. 5 shows the circuit diagram of an example of the circuits 12 and 15 in FIG. 2. The circuit 15 is formed in this embodiment by two T-type flip-flops whose clock inputs T both receive the signal J supplied by the frequency divider 9 in FIG. 2, at a frequency of 1 Hz. The resetting input R of the flip-flop 38 receives the signal K which is also supplied by the frequency divider 9, at a frequency of 64 Hz. The output Q of the flip-flop 38 therefore goes to state "1" every second, at the moment that the signal J goes to state "1", and goes back to state "0" about 7.8 milliseconds later, when the signal K in turn goes to state "1". The output Q of the flip-flop 38 therefore produces the signal 0.

The reset input R of the flip-flop 39 receives the signal N from the calculating circuit 26 shown in FIG. 2. The output Q of the flip-flop 39 therefore also goes to state "1" when the signal J goes to state "1", and goes back to state "0" when the circuit 26 supplies the signal N at the time $t_2$, determined in the above-described manner. The output Q of the flip-flop 39 therefore produces the signal Z which is equal in duration to the optimum duration of the drive pulse.

In this embodiment, the circuit 12 of FIG. 2 comprises a logical circuit 43 formed by four AND-gates 431 to 434, two OR-gates 435 and 436 and two inverters 437 and 438. The winding 11*a* of the motor is connected into a circuit formed by four transmission gates 44 to 47 which are connected in conventional manner between the terminal +V of the power supply source 10 and earth.

Two other transmission gates 48 and 49 each connect one of the terminals of the winding 11*a* to a first terminal of a resistor 17 whose second terminal is connected to the input 16*a* of the circuit 16 shown in FIG. 2. The resistor 17 forms the above-mentioned measuring resistor.

The control electrodes of the gates 44 to 49 are connected to the outputs of the circuit 43, the inputs of which respectively receive the signals I, Z and M. The circuit 43 will not be described in greater detail herein, as it can be readily seen, by referring to FIG. 5*a*, that:

when the signal Z is at state "0", that is to say, between the drive pulses, the control electrodes of the gates 44 to 49 are all at state "0", irrespective of the state of the signal I and M. The gates 44 to 49 are therefore closed and the winding 11*a* is separated from the power supply source;

when the signal Z is at state "1", that is to say, during the drive pulses, and the signal M is a state "0", the gates 44 and 46 are in a conducting condition if the signal I is at state "0", with all the other gates being in a non-conducting condition, while the gates 45 and 47 are in a conducting condition if the signal I is at state "1", in which case all the other gates are also in a non-conducting condition. The power supply source is therefore connected to the winding 11*a* by way of the gates 44 and 46 or 45 and 47, and a current flows in the winding 11*a* in the direction indicated by the arrow 11*b* or in the opposite direction. That situation is the situation which occurs between the interruption periods, during the elementary pulses; and when the signal Z is at state "1" and the signal M is also at state "1", the gates 47 and 48 or 46 and 49 are in a conducting condition, depending on the state "0" or "1" of the signal I, with all the other gates then being in a non-conducting condition. The power supply source is therefore disconnected from the winding 11*a* and the current flowing in the winding 11*a* also flows in the resistor 17 in which it produces the voltage that is applied to the input 16*a* of the measuring circuit 16. That situation is the one which occurs during the drive pulse interruption periods.

Figure 6:
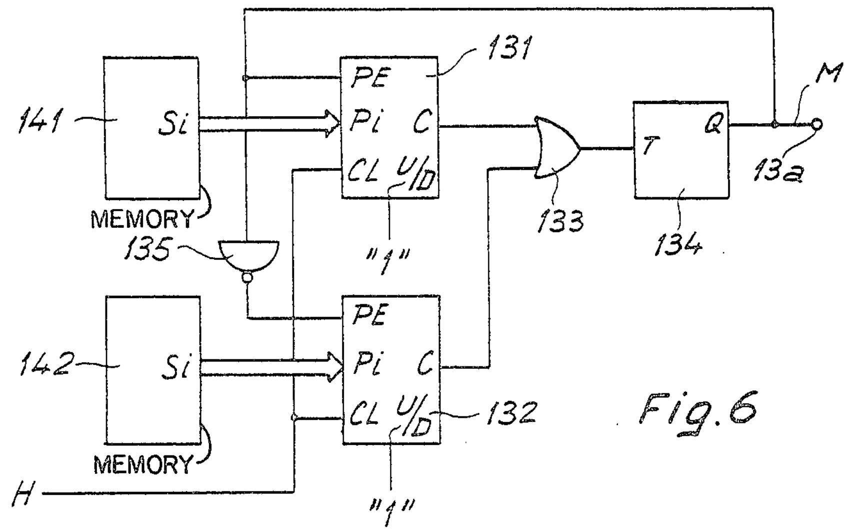
FIG. 6 is a detailed diagram of a fourth part of the device shown in FIG. 2.

FIG. 6 shows by way of example, the circuit diagram of an embodiment of the circuits 13 and 14 of the FIG. 2 device.

The circuit 13 comprises two up-down preselection counters 131 and 132. The inputs U/D for controlling the direction of counting of the counters 131 and 132 are permanently at state 1. The counters 131 and 132 therefore operate in a down-counting mode. Their preselection terminals, which are generally denoted by Pi, are respectively connected to the outputs, generally denoted by Si, of two memories 141 and 142 which form the memory 14 of the circuit shown in FIG. 2. The memories 141 and 142 may be for example read only memories.

The clock inputs CL of the counters 131 and 132 are both connected to the output of the generator 8 (see FIG. 2) which produces the signal H. The counters 131 and 132 each comprise a coincidence output C which produces a short pulse whenever the content of the counters becomes equal to zero. The coincidence outputs C are connected to the inputs of an OR gate 133 having its output connected to the clock input T of a T-type flip-flop 134. The output Q of the flip-flop 134 is connected to the preselection control input PE of the counter 131, by way of an inverter 135, to the preselection input PE of the counter 132. The output Q of the flip-flop 134 is also connected to the output 13*a* of the circuit 13.

Figure 6A:
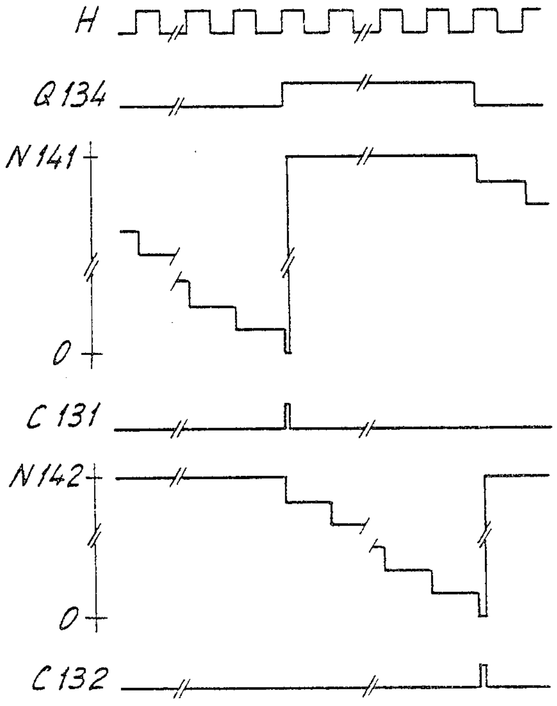
FIG. 6*a* is a diagram showing signals measured at various points in the circuit of FIG. 6, in respect of time.

The mode of operation of the circuit shown in FIG. 6 will now be described with reference to FIG. 6*a*.

When the output Q of the flip-flop 134 is at state "0", the input PE of the circuit 132 is at state "1". The content of the counter 132 therefore assumes a condition corresponding to the content of the memory 142 and the counter 132 remains blocked in that condition, which is indicated by N142 in FIG. 6*a*.

On the other hand, the input PE of the counter 131 is at state "0" and the counter 131 counts the pulses of the signal H, in the down-counting mode. When the counter content reaches zero, its output C produces a pulse which is transmitted to the input T of the flip-flop 134, by way of the gate 133. The output Q of the flip-flop 134 and the input PE of the counter 131 therefore go to state "1". The content of the counter 131 therefore assumes a condition corresponding to the content of the memory 141 and the counter 131 is blocked in that condition, which is indicated by N141 in FIG. 6*a*. At the same time, the input PE of the counter 132 goes to state "0". The counter 132 begins to count the pulses of the signal H, in the down-counting mode. When the counter content reaches zero, the output C of the counter produces a pulse which is transmitted by means of the gate 133 to the input T of the flip-flop 134. The output Q of the flip-flop 134 goes back to state "0", and the above-described procedure begins again.

The output Q of the flip-flop 134 which produces the signal M therefore goes alternately to state "0" and to state "1" during periods of time which depend on the frequency of the signal H and the content of the memories 141 and 142 respectively.

The duration of the periods of interruption of the drive pulses, which is equal to the period of time for which the signal M is at state "1", and the duration of the elementary pulses which separate the interruption periods, which is equal to the period of time for which the signal M is at state "0", can therefore be determined independently of each other. The above-mentioned durations are determined in any fashion. They may be fixed or they may vary, in a manner which will not be described herein, in dependence on parameters such as the voltage of the power supply source 10, or the mechanical load driven by the motor, or any other parameter.

I claim:

1. A method for reducing the consumption of a stepping motor comprising a winding having a resistance of value R and an inductance of value L, and a rotor which is magnetically coupled to said winding, comprising triggering a drive pulse each time that the rotor is to turn through one step, detecting the mechanical load driven by the rotor during its rotary movement, controlling the duration of the drive pulse in dependence on said mechanical load, forming said drive pulse by a series of elementary pulses separated by interruption periods of a duration T1, and determining said mechanical load by measuring, during said interruption periods, a parameter which is representative of the variation in the voltage induced in the winding by the rotary movement of the rotor.

2. The method of claim 1, further comprising during each interruption period, substantially short-circuiting the winding and measuring said parameter by measuring the voltage produced in a measuring resistor of value Rm by the current flowing in the winding, storing the value of that voltage at a first time, forming the product of the stored value by a first constant factor which is equal to $\tau - T1/\tau$, in which $\tau = L/R$, forming the difference between said product and the measured voltage, and comparing said difference to a second constant factor equal to $U_{is} \cdot Rm/R \cdot T1/\tau$ in which $U_{is}$ is a predetermined reference voltage, the time which elapses between the beginning of the drive pulse and the time at which said difference becomes equal to or higher than said second factor being representative of said variation in induced voltage.

3. The method of claim 1, further comprising, during each interruption period, substantially short-circuiting the winding and measuring said parameter by measuring the voltage produced in a measuring resistor of value Rm by the current flowing in the winding, storing the value of that voltage at a first time, forming the product of the stored value by a constant factor which is equal to $\tau - T1/\tau$, in which $\tau = L/R$, forming the difference between said product and a second constant factor which is equal to $U_{is} \cdot Rm/R \cdot T1/\tau$, in which $U_{is}$ is a predetermined reference voltage, and comparing said difference to the measured voltage, the time which elapses between the beginning of the drive pulse and the time at which said measured voltage becomes equal to or less than said difference being representative of said variation in induced voltage.

4. The method of claim 1, further comprising, during each interruption period, substantially short-circuiting the winding and measuring said parameter by measuring first and second voltages which are produced in a measuring resistor of value Rm by the current flowing in the winding at first and second times respectively, which are separated by a period of time of duration T1', forming the product of the first voltage by a first factor equal to $\tau - T1'/\tau$ in which $\tau = L/R$, forming the difference of said product and said second voltage, and comparing said difference to a second constant factor which is equal to $U_{is} \cdot Rm/R \cdot T1'/\tau$, *in which* $U_{is}$ is a predetermined reference voltage, the time which elapses between the beginning of the drive pulse and the time at which said difference becomes equal to or higher than said second factor being representative of said variation in induced voltage.

5. The method of claim 1, further comprising, during each interruption period, substantially short-circuiting the winding and measuring said parameter by measuring first and second voltages produced in a measuring resistor of value Rm by the current flowing in the winding at first and second times respectively, which are separated by a period of time of duration T1', forming the product of the first voltage and a first constant factor equal to $\tau - T1'/\tau$, in which $\tau = L/R$, forming the difference between said product and a second constant factor equal to $U_{is} \cdot Rm/R \cdot T1'/\tau$, in which $U_{is}$ is a predetermined reference voltage, and comparing said difference to said second voltage, the time which elapses between the beginning of the drive pulse and the time at which said second voltage becomes equal to or less than said difference being representative of said variation in said induced voltage.

6. The method of claim 4 in which said first and second times respectively coincide with the beginning and the end of each interruption period.

7. A device for controlling a stepping motor comprising a winding having a resistance of value R and an inductance of value L and a rotor which is magnetically coupled to said winding, said device comprising means for producing a control signal whenever the rotor is to rotate by a step, means for applying a drive pulse to the winding in response to the control signal, means for producing a chopping signal, means for interrupting the drive pulse during interruption periods of duration T1 in response to the chopping signal, means for detecting the mechanical load driven by the rotor comprising means which respond to the chopping signal to measure, during the interruption periods, a parameter which is representative of the variation in the voltage induced in the winding by the rotary movement of the rotor, and means for controlling the duration of the drive pulse in dependence on said mechanical load.

8. The device of claim 7, further comprising means for substantially short-circuiting the winding in response to the chopping signal, and means comprising a measuring resistor of value Rm for producing a measuring voltage which is representative of the current flowing in the winding during the interruption periods, wherein said means for measuring the parameter comprise means for storing the value of the measuring voltage at a first time, means for forming the product of the stored value by a first constant factor which is equal to $\tau - T1/\tau$, in which $\tau = L/R$, means for forming the difference between said product and the measuring voltage, and means for comparing said difference to a second constant factor which is equal to $U_{is}\cdot Rm/R\cdot T1/\tau$, in which $U_{is}$ is a predetermined reference voltage, the time which elapses between the beginning of the drive pulse and the time at which said difference becomes equal to or greater than said second factor being representative of said variation in induced voltage.

9. The device of claim 7, further comprising means for substantially short-circuiting the winding in response to the chopping signal and means comprising a measuring resistor of value Rm for producing a measuring voltage which is representative of the current flowing in the winding during the interruption periods, wherein said means for measuring the parameter comprise means for storing the value of the measuring voltage at a first time, means for forming the product of the stored value by a first constant factor which is equal to $\tau - T1/\tau$, in which $\tau = L/R$, means for forming the difference between said product and a second constant factor which is equal to $U_{is}\cdot Rm/R\cdot T1/\tau$, in which $U_{is}$ is a predetermined reference voltage, and means for comparing said difference to the measuring voltage, the time which elapses between the beginning of the drive pulse and the time at which said measuring voltage becomes equal to or less than said difference being representative of said variation in induced voltage.

10. The device of claim 7, further comprising means for substantially short-circuiting the winding in response to the chopping signal, means comprising a measuring resistor of value Rm for measuring first and second voltages which are produced by the current flowing in the winding at first and second times respectively, which are separated by a period of time T1′, means for forming the product of the first voltage by a first factor equal to $\tau - T1'/\tau$, in which $\tau = L/R$, means for forming the difference between said product and said second voltage, and means for comparing said difference to a second constant factor which is equal to $U_{is}\cdot Rm/R\cdot T1'/\tau$, in which $U_{is}$ is a predetermined reference voltage, the time which elapses between the beginning of the drive pulse and the time at which said difference becomes equal to or greater than said second factor being representative of said variation in induced voltage.

11. The device of claim 7, further comprising means for substantially short-circuiting the winding in response to the chopping signal, means comprising a measuring resistor of value Rm for measuring first and second voltages produced by the current flowing in the winding at first and second times respectively, separated by a period of time T1′, means for forming the product of the first voltage by a first factor equal to $\tau - T1'/\tau$, in which $\tau = L/R$, means for forming the difference between said product and a second constant factor equal to $U_{is}\cdot Rm/R\cdot T1'/\tau$, wherein $U_{is}$ is a predetermined reference voltage, and means for comparing said difference to said second voltage, the time which elapses between the beginning of the drive pulse and the time at which said second voltage becomes equal to or less than said difference being representative of said variation in induced voltage.

12. The device of claim 11, wherein said first and second times respectively coincide with the beginning and the end of each interruption period.

13. The method of claim 5 in which said first and second times respectively coincide with the beginning and the end of each interruption period.

14. The device of claim 10, wherein said first and second times respectively coincide with the beginning and the end of each interruption period.

* * * * *